United States Patent
Kato

(10) Patent No.: US 11,600,298 B2
(45) Date of Patent: Mar. 7, 2023

(54) DISK DEVICE

(71) Applicants: Kabushiki Kaisha Toshiba, Tokyo (JP); Toshiba Electronic Devices & Storage Corporation, Tokyo (JP)

(72) Inventor: Yasuhiko Kato, Setagaya Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/514,921

(22) Filed: Oct. 29, 2021

(65) Prior Publication Data

US 2022/0310124 A1 Sep. 29, 2022

(30) Foreign Application Priority Data

Mar. 23, 2021 (JP) .............................. JP2021-048776

(51) Int. Cl.
| | | |
|---|---|---|
| *G11B 5/54* | (2006.01) | |
| *G11B 5/48* | (2006.01) | |
| *G11B 21/12* | (2006.01) | |
| *G11B 5/012* | (2006.01) | |
| *G11B 21/08* | (2006.01) | |

(52) U.S. Cl.
CPC .............. *G11B 21/12* (2013.01); *G11B 5/012* (2013.01); *G11B 21/08* (2013.01)

(58) Field of Classification Search
CPC ......... G11B 5/54; G11B 5/4826; G11B 21/22; G11B 5/102; G11B 5/5573; G11B 5/4813; G11B 5/4833; G11B 5/4886; G11B 5/55; G11B 5/5539; G11B 5/4873; G11B 5/5578; G11B 5/484; G11B 5/012; G11B 5/56; G11B 21/12
USPC ........................ 360/255, 254.6, 254.7, 255.2
See application file for complete search history.

(56) References Cited

U.S. PATENT DOCUMENTS

| | | |
|---|---|---|
| 6,181,529 B1 | 1/2001 | Aoyagi et al. |
| 6,414,821 B1 | 7/2002 | Tokuyama et al. |
| 6,538,851 B1 | 3/2003 | Sasaki |

(Continued)

FOREIGN PATENT DOCUMENTS

| | | |
|---|---|---|
| JP | 11-110933 A | 4/1994 |
| JP | 2003-141841 A | 5/2003 |

(Continued)

*Primary Examiner* — Nabil Z Hindi
(74) *Attorney, Agent, or Firm* — Allen & Overy LLP

(57) ABSTRACT

According to one embodiment, a disk device includes a recording medium, a magnetic head, a ramp, and an actuator. The recording medium has a recording surface and is rotatable around a first rotation axis. The actuator includes a first portion extending so as to be separated from a second rotation axis and separated from the recording surface as the distance from the second rotation axis increases, holds the magnetic head, and is rotatable around the second rotation axis. A first support is provided on the ramp, extends around the second rotation axis, and can support the first portion so that the magnetic head is separated from the recording surface. A second support is provided on the ramp, is located between the first rotation axis and the first support, is separated from the second rotation axis farther than the first support, and can support the first portion.

9 Claims, 5 Drawing Sheets

(56) References Cited

U.S. PATENT DOCUMENTS

| | | | |
|---|---|---|---|
| 6,721,134 B1 | 4/2004 | Pottebaum et al. | |
| 7,558,023 B2 | 7/2009 | Ohwe | |
| 10,910,005 B1 * | 2/2021 | Teo | G11B 5/54 |
| 2004/0027725 A1 * | 2/2004 | Pan | G11B 5/484 |
| | | | 360/245.9 |
| 2005/0270699 A1 | 12/2005 | Takahashi | |
| 2006/0268462 A1 | 11/2006 | Ohwe | |
| 2008/0124580 A1 * | 5/2008 | Musashi | G11B 21/22 |
| 2008/0204925 A1 | 8/2008 | Ohta et al. | |
| 2009/0251824 A1 | 10/2009 | Heo et al. | |
| 2017/0309303 A1 | 10/2017 | Aoki et al. | |

FOREIGN PATENT DOCUMENTS

| | | |
|---|---|---|
| JP | 2006-338744 A | 12/2006 |
| JP | 2008-210476 A | 9/2008 |
| JP | 4459114 B2 | 4/2010 |

* cited by examiner

DISK DEVICE

CROSS-REFERENCE TO RELATED APPLICATION

This application is based upon and claims the benefit of priority from Japanese Patent Application No. 2021-048776, filed Mar. 23, 2021, the entire contents of which are incorporated herein by reference.

FIELD

Embodiments described herein relate generally to a disk device.

BACKGROUND

A disk device such as a hard disk drive (HDD) includes, for example, a magnetic disk, a magnetic head, a suspension, an actuator, and a ramp. The magnetic head is mounted on the suspension and reads and writes information from and to the magnetic disk. The actuator rotates the suspension and moves the magnetic head along the surface of the magnetic disk.

The actuator moves the magnetic head between the load position and the unload position. At the load position, the magnetic head is located on the surface of the magnetic disk and reads and writes information from and to the magnetic disk. The actuator moves the magnetic head to the unload position away from the surface of the magnetic disk when the magnetic head does not read or write information. The ramp supports the suspension when the magnetic head is located at the unload position.

Examples of related art include JP-A-2006-338744.

SUMMARY

In certain embodiments, a disk device comprises a recording medium having a recording surface. The recording medium is rotatable around a first rotation axis that intersects the recording surface. The disk device further comprises a magnetic head configured to read and write information from and to the recording medium. The disk device further comprises a ramp separated from the first rotation axis in a first radial direction, and an actuator. The actuator includes a first portion separated from a second rotation axis in a second radial direction, and a second portion located between the first portion and the second rotation axis. The second portion of the actuator is configured to hold the magnetic head, and to rotate around the second rotation axis between a load position and an unload position. In the load position, the magnetic head is located on the recording surface. In the unload position, the first portion is held by the ramp, and the magnetic head is separated in the axial direction of the first rotation axis from the recording surface at first distance. The first distance at which the magnetic head is separated from the recording surface is larger than a distance between the magnetic head and the recording surface when the magnetic head is at the load position;

The disk device further comprises a first support provided on the ramp. The first support extends around the second rotation axis and is configured to support a first subportion of the first portion with the magnetic head separated in the axial direction from the recording surface at a second distance when the actuator is located in a first position between the load position and the unload position. A second support is provided on the ramp, the second support being configured to support a second subportion of the first portion of the actuator. The second subportion is separated from the second rotation axis farther than is the first subportion, and the second subportion is separated in the axial direction from the recording surface at a third distance when the actuator is located in a second position between the load position and the first position. The first distance is greater than the second distance, and the second distance is greater than the third distance.

In further embodiments, the second support includes a first extension extending around the second rotation axis. In some embodiments, the second support includes a second extension provided between the first extension and the first support. In such embodiments, a length of the second extension in a circumferential direction of the second rotation axis is shorter than a length of the second extension in the second radial direction.

In further embodiments, the first portion of the actuator extends so as to be separated from the recording surface in the axial direction as the distance from the second rotation axis increases. In certain embodiments, a first angle between the first subportion and the recording surface is smaller than a second angle between the second subportion and the recording surface. In some embodiments, when the actuator moves from the load position to the unload position, the second subportion collides with the second support of the ramp. In certain embodiments, the second support extends so as to be separated from the recording surface as the distance from the first rotation axis increases. In further embodiments, at least a part of the first support extends so as to be separated from the recording surface in the axial direction as the distance from the first rotation axis increases. In some embodiments, one end of the first support in the circumferential direction of the second rotation axis overlaps the recording surface in the axial direction.

In certain embodiments, a disk device comprises a recording medium having a recording surface. The recording medium is rotatable around a first rotation axis that intersects the recording surface. The disk device further comprises a magnetic head configured to read and write information from and to the recording medium and a ramp separated from the first rotation axis in a first radial direction. The disk device further comprises an actuator. The actuator includes a first portion extending so as to be separated from a second rotation axis in a second radial direction and is separated from the recording surface in an axial direction of the first rotation axis as the distance from the second rotation axis increases. The actuator further includes a second portion located between the first portion and the second rotation axis. The second portion of the actuator is configured to hold the magnetic head, and to rotate around the second rotation axis.

The disk device further comprises a first support provided on the ramp, the first support extending around the second rotation axis and being capable of supporting the first portion so that the magnetic head is separated from the recording surface in the axial direction. The disk device further comprises a second support provided on the ramp, the second support being located in a position between the first rotation axis and the first support. The second support is separated from the second rotation axis farther than the first support, and the second support is configured to support the first portion.

DETAILED DESCRIPTION

When a magnetic head moves from the load position to the unload position, for example, a suspension comes into contact with a ramp and is supported by the ramp. If the suspension is set to abut the ramp at a position relatively close to a magnetic disk, the suspension may deviate from a position where the suspension can be supported by the ramp.

Embodiments provide a disc device in which a ramp can more reliably support a suspension.

In general, according to one embodiment, the disk device includes a recording medium, a magnetic head, a ramp, an actuator, a first support, and a second support. The recording medium has a recording surface and is rotatable around a first rotation axis that intersects the recording surface. The magnetic head is configured to read and write information from and to the recording medium. The ramp is separated from the first rotation axis. The actuator includes a first portion, which may be a sliding portion, that is separated from a second rotation axis and extends so as to be separated from the recording surface in the axial direction of the first rotation axis as the distance from the second rotation axis increases, and a second portion, which may be a holding portion, that is located between the first portion and the second rotation axis and holds the magnetic head; and is rotatable around the second rotation axis. The first support is provided on the ramp, extends around the second rotation axis, and can support the first portion so that the magnetic head is separated from the recording surface in the axial direction. The second support is provided on the ramp, is located between the first rotation axis and the first support, is separated from the second rotation axis farther than the first support, and can support the first portion.

First Embodiment

A first embodiment will be described below with reference to FIGS. 1 to 6. In this specification, the components according to the embodiment and the descriptions of the components may be described in a plurality of expressions. The components and the descriptions thereof are examples and are not limited by the expressions herein. The components may also be identified by names different from those herein. The components may also be described by expressions different from those herein.

Figure 1:
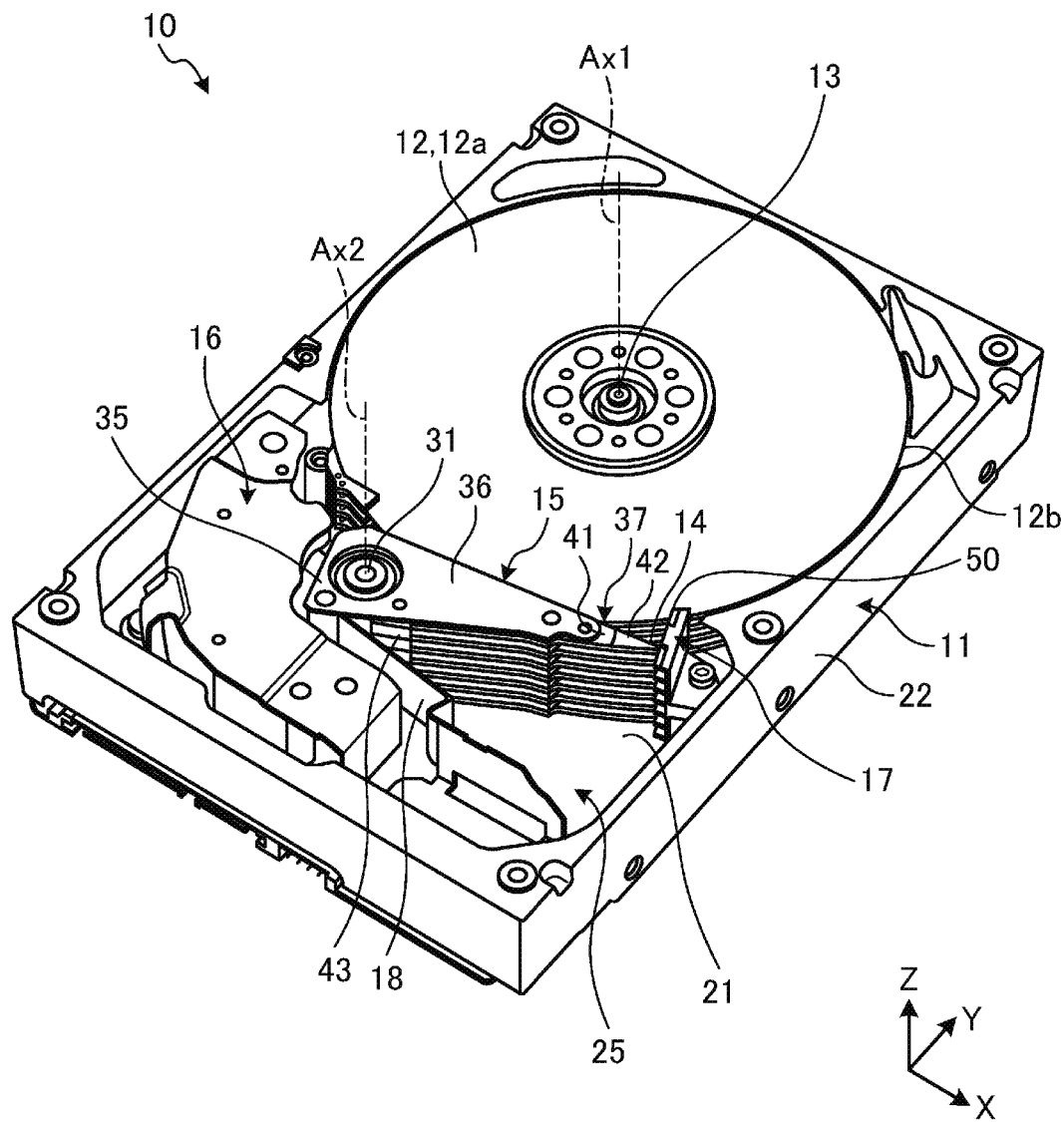
FIG. 1 is an illustrative perspective view showing a hard disk drive (HDD) according to a first embodiment.

FIG. 1 is an illustrative perspective view showing a hard disk drive (HDD) 10 according to the first embodiment. The HDD 10 is an example of a disk device and may also be referred to as an electronic device, a storage device, an external storage device, or a magnetic disk device.

As shown in each drawing, the X-axis, Y-axis, and Z-axis are defined in this specification for convenience. The X-axis, Y-axis, and Z-axis are orthogonal to each other. The X-axis is provided along the width of the HDD 10. The Y-axis is provided along the length of the HDD 10. The Z axis is provided along the thickness of the HDD 10.

Further, in this specification, the X direction, the Y direction, and the Z direction are defined. The X direction is a direction along the X-axis and includes the +X direction indicated by the arrow on the X-axis and the −X direction which is the opposite direction of the arrow on the X-axis. The Y direction is a direction along the Y-axis and includes the +Y direction indicated by the arrow on the Y-axis and the −Y direction which is the opposite direction of the arrow on the Y-axis. The Z direction is a direction along the Z-axis and includes the +Z direction indicated by the arrow on the Z-axis and the −Z direction which is the opposite direction of the arrow on the Z-axis.

As shown in FIG. 1, the HDD 10 includes a housing 11, a plurality of magnetic disks 12, a spindle motor 13, a plurality of magnetic heads 14, an actuator assembly 15, a voice coil motor (VCM) 16, a ramp load mechanism 17, and a flexible printed circuit board (FPC) 18. The magnetic disk 12 is an example of a recording medium. The magnetic head 14 may also be referred to as a slider. The actuator assembly 15 is an example of an actuator.

The housing 11 extends in the Y direction and is formed in the shape of a rectangular parallelepiped box open in the +Z direction. The housing 11 includes a bottom wall 21 and a peripheral wall 22. The bottom wall 21 is formed in the shape of a substantially rectangular plate extending along the X-Y plane. The peripheral wall 22 projects in the substantially +Z direction from the edge of the bottom wall 21 and is formed in a substantially rectangular frame shape. The bottom wall 21 and the peripheral wall 22 are made of a metal material such as an aluminum alloy and are integrally formed.

An inner chamber 25 opened in the +Z direction is provided inside the housing 11. The inner chamber 25 is formed (defined, partitioned) by, for example, the bottom wall 21 and the peripheral wall 22. Therefore, the peripheral wall 22 surrounds the inner chamber 25. The inner chamber 25 is substantially airtightly closed by, for example, a cover attached to the housing 11.

The inner chamber 25 is filled with a gas different from air. For example, a low-density gas having a density lower than that of air, an inert gas having a low reactivity, or the like is filled in the inner chamber 25. In this embodiment, the inner chamber 25 is filled with helium. The inner chamber 25 may be filled with another fluid. Further, the inner chamber 25 may be maintained at a vacuum, a low pressure close to a vacuum, or a negative pressure lower than the atmospheric pressure.

The plurality of magnetic disks 12 are formed in a disk shape extending along the X-Y plane. The diameter of the magnetic disk 12 is, for example, 3.5 inches, but is not limited to this example. Each of the plurality of magnetic disks 12 includes, for example, at least one recording surface 12a and an outer edge 12b.

The recording surface 12a is provided on at least one of the upper surface and the lower surface of the magnetic disk 12. In other words, each of the plurality of recording surfaces 12a is the surface of the magnetic disk 12 facing in the substantially +Z direction or the surface of the magnetic disk 12 facing in the substantially −Z direction. The recording surface 12a is a substantially flat surface extending along the X-Y plane. The magnetic recording layer of the magnetic disk 12 is provided on the recording surface 12a. The magnetic recording layer may not be provided on a part of the recording surface 12a. The outer edge 12b is the outer peripheral surface of the magnetic disk 12.

The plurality of magnetic disks 12 are stacked in the Z direction with an interval. The spindle motor 13 includes a hub that supports the plurality of magnetic disks 12. The plurality of magnetic disks 12 are held by, for example, a cramp spring on the hub of the spindle motor 13.

The spindle motor 13 rotates the plurality of magnetic disks 12 around a first rotation axis Ax1. The first rotation axis Ax1 is a virtual axis extending in the substantially Z direction. That is, the first rotation axis Ax1 extends in a direction orthogonal to (intersecting) the recording surface 12a.

The first rotation axis Ax1 is the center of rotation by the spindle motor 13 and is also the central axis of the magnetic disk 12 and the hub of the spindle motor 13. The central axis of the disk-shaped magnetic disk 12 and the central axis of the hub of the spindle motor 13 may deviate from the center of rotation by the spindle motor 13.

The magnetic head 14 records and reproduces information on the recording surface 12a of the magnetic disk 12. In other words, the magnetic head 14 reads and writes information from and to the magnetic disk 12. The magnetic head 14 is mounted on the actuator assembly 15.

The actuator assembly 15 is rotatably supported by a support shaft 31 disposed at a position separated from the magnetic disk 12. The support shaft 31 extends from the bottom wall 21 of the housing 11 in the substantially +Z direction, for example.

The actuator assembly 15 can rotate around a second rotation axis Ax2 separated from the first rotation axis Ax1. The second rotation axis Ax2 is a virtual axis extending in the substantially +Z direction. Therefore, the first rotation axis Ax1 and the second rotation axis Ax2 are arranged so as to be substantially parallel. The second rotation axis Ax2 is, for example, the center of rotation of the actuator assembly 15 and also the central axis of the support shaft 31.

In this specification, the axial direction, the radial direction, and the circumferential direction are defined. The axial direction is a direction along a virtual axis such as the first rotation axis Ax1 and the second rotation axis Ax2, and includes one direction and the other direction along the axis. The radial direction is a direction orthogonal to the axis and includes a plurality of directions orthogonal to the axis. The circumferential direction is a direction that rotates around the axis, and includes a direction that rotates clockwise around the axis and a direction that rotates counterclockwise.

As described above, the first rotation axis Ax1 and the second rotation axis Ax2 extend substantially in parallel in the substantially Z direction and are separated from each other. That is, the axial direction of the first rotation axis Ax1 and the axial direction of the second rotation axis Ax2 are the Z directions. The first rotation axis Ax1 is separated from the second rotation axis Ax2 in the radial direction of the second rotation axis Ax2.

The VCM 16 rotates the actuator assembly 15 around the second rotation axis Ax2 and arranges the actuator assembly 15 at a predetermined position. When the magnetic head 14 moves to the outermost periphery of the magnetic disk 12 due to the rotation of the actuator assembly 15 by the VCM 16, the ramp load mechanism 17 holds the magnetic head 14 at a position separated from the magnetic disk 12.

The actuator assembly 15 includes an actuator block 35, a plurality of arms 36, and a plurality of head suspension assemblies 37. The head suspension assembly 37 may also be referred to as a head gimbal assembly (HGA).

The actuator block 35 is rotatably supported by the support shaft 31 via, for example, a bearing. The plurality of arms 36 project from the actuator block 35 in the radial direction of the second rotation axis Ax2. The actuator assembly 15 may be divided and the arm 36 may project from each of the plurality of actuator blocks 35.

The plurality of arms 36 are arranged in the axial direction of the second rotation axis Ax2 with an interval. Each of the arms 36 is formed in a plate shape that allows entry into a gap between adjacent magnetic disks 12. The plurality of arms 36 extend substantially in parallel.

The actuator block 35 and the plurality of arms 36 are integrally formed of, for example, aluminum. The materials of the actuator block 35 and the arm 36 are not limited to this example.

The voice coil of the VCM 16 is provided on the protrusion projecting from the actuator block 35 to the opposite side of the arm 36. The VCM 16 includes a pair of yokes, a voice coil arranged between the yokes, and a magnet provided on the yokes.

As described above, the VCM 16 rotates the actuator assembly 15 around the second rotation axis Ax2. In other words, the VCM 16 integrally rotates (moves) the actuator block 35, the arm 36, and the head suspension assembly 37 around the second rotation axis Ax2.

The head suspension assembly 37 is attached to the tip of the corresponding arm 36 and projects from the arm 36. As a result, the plurality of head suspension assemblies 37 are arranged in the axial direction of the second rotation axis Ax2 with an interval. Each of the plurality of head suspension assemblies 37 includes a base plate 41, a load beam 42, and a flexure 43.

The base plate 41 and the load beam 42 are made of, for example, stainless steel. The materials of the base plate 41 and the load beam 42 are not limited to this example. The base plate 41 is formed in a plate shape and is attached to the tip of the arm 36. The load beam 42 is attached to the tip of the base plate 41 and projects from the base plate 41 in the radial direction of the second rotation axis Ax2.

The load beam 42 is thinner than the base plate 41 and is formed in a plate shape extending along the X-Y plane. That is, the load beam 42 is supported by the base plate 41 in a cantilever shape, and can be bent with one end attached to the base plate 41 as a fulcrum.

Figure 2:
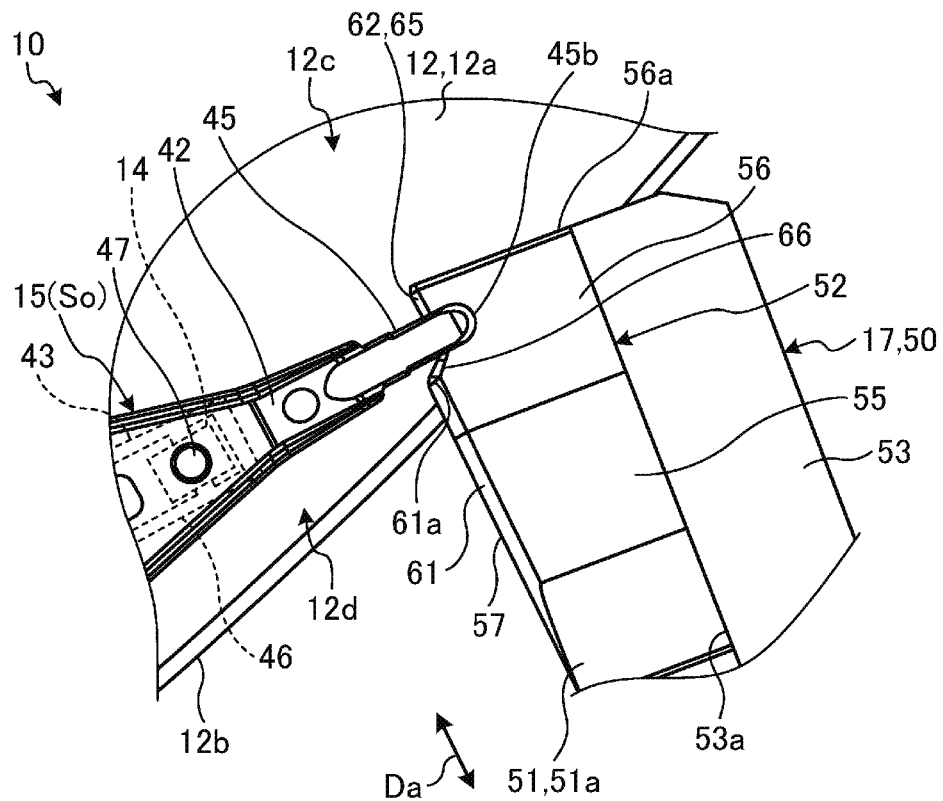
FIG. 2 is an illustrative plan view showing a part of the HDD of the first embodiment.

FIG. 2 is an illustrative plan view showing a part of the HDD 10 of the first embodiment. As shown in FIG. 2, the load beam 42 includes a lift tab 45. The lift tab 45 is an example of a first portion, which, as previously discussed, is separated from a second rotation axis and extends so as to be separated from the recording surface in the axial direction of the first rotation axis as the distance from the second rotation axis increases. In the illustrative embodiment of FIG. 2, the lift tab 45 is located at the tip of the actuator assembly 15 in the radial direction of the second rotation axis Ax2. In other words, the lift tab 45 is separated from the second rotation axis Ax2 in the radial direction of the second rotation axis Ax2.

Figure 3:
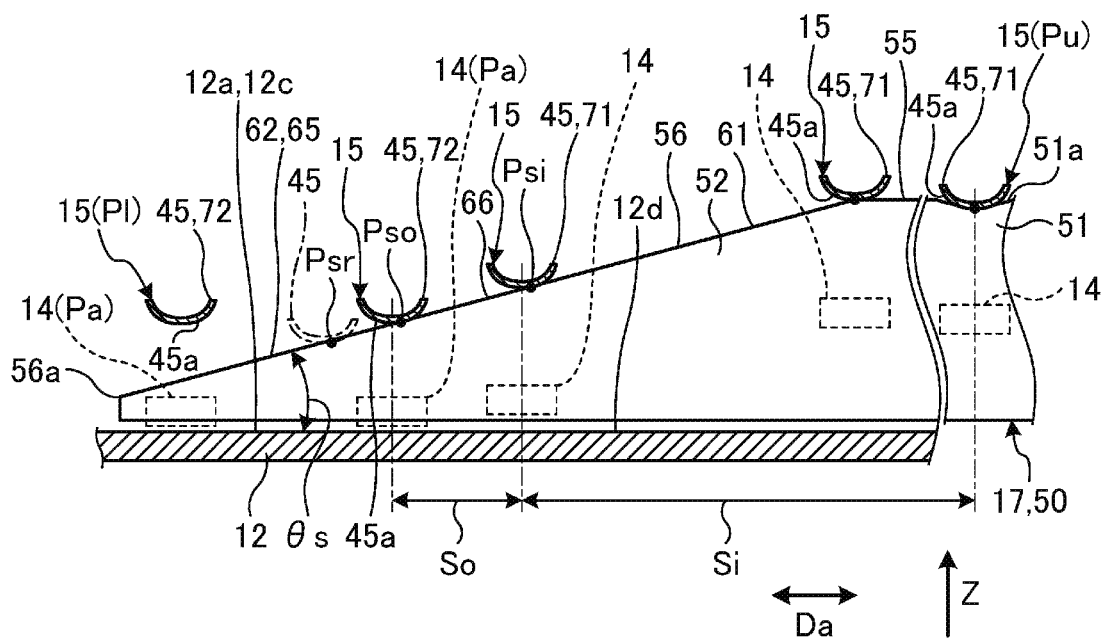
FIG. 3 is an illustrative cross-sectional view schematically showing a lift tab and a ramp load mechanism of the first embodiment.

FIG. 3 is an illustrative cross-sectional view schematically showing the lift tab 45 and the ramp load mechanism 17 of the first embodiment. As shown by arrows in each drawing, in the following description, the circumferential direction of the second rotation axis Ax2 may be referred to as a circumferential direction Da, and the radial direction of the second rotation axis Ax2 may be referred to as a radial direction Dr.

FIG. 3 schematically shows the magnetic disk 12, the ramp load mechanism 17, and the lift tab 45 so that the circumferential direction Da corresponds to the left-right direction of the paper surface. As shown in FIG. 3, the lift tab 45 has a sliding surface 45a.

The sliding surface 45a is a substantially arcuate curved surface that projects toward the recording surface 12a of the magnetic disk 12 to which the actuator assembly 15 corresponds. The lift tab 45 is bent into a substantial "u"-shape extending in the radial direction of the second rotation axis Ax2 so that the sliding surface 45a is formed. The shape of the lift tab 45 is not limited to this example.

The flexure 43 in FIG. 2 is formed in an elongated strip shape. The shape of the flexure 43 is not limited to this example. The flexure 43 is a stacked board including a metal plate (lining layer) such as stainless steel, an insulating layer formed on the metal plate, a conductive layer formed on the insulating layer and forming a plurality of wirings (wiring patterns), and a protective layer (insulating layer) covering the conductive layer.

The flexure 43 is attached to the base plate 41 and the load beam 42. One end of the flexure 43 includes a gimbal portion (elastic support) 46 that is located above the load beam 42 and is displaceable. The gimbal portion 46 is an example of a second portion.

The gimbal portion 46 is located between the load beam 42 and the recording surface 12a of the magnetic disk 12 in the Z direction. The magnetic head 14 is mounted on the gimbal portion 46. In other words, the gimbal portion 46 holds the magnetic head 14. The flexure 43 is electrically connected to the magnetic head 14.

The gimbal portion 46 is swingably supported by, for example, a substantially hemispherical protrusion 47 provided on the load beam 42. Therefore, the magnetic head 14 can swing together with the gimbal portion 46.

The gimbal portion 46 is located between the lift tab 45 and the second rotation axis Ax2 in the radial direction Dr of the second rotation axis Ax2. Therefore, the magnetic head 14 is also located between the lift tab 45 and the second rotation axis Ax2 in the radial direction Dr.

When the load beam 42 is bent so that the lift tab 45 is displaced in the Z direction, the gimbal portion 46 and the magnetic head 14 are also displaced in the Z direction. The displacement of the gimbal portion 46 and the magnetic head 14 does not have to completely follow the displacement of the lift tab 45. For example, the displacement of the gimbal portion 46 and the magnetic head 14 may occur later than the displacement of the lift tab 45. Further, for example, when the lift tab 45 is displaced within a predetermined range, the gimbal portion 46 and the magnetic head 14 may not be displaced.

One end of the FPC 18 in FIG. 1 is connected to the flexure 43. The other end of the FPC 18 is connected to a substrate arranged outside the housing 11 via, for example, a connector provided in the housing 11. For example, a controller that controls the entire HDD 10 and an interface connector connected to a host computer are mounted on the substrate. The substrate is electrically connected to the magnetic head 14 via the FPC 18 and the flexure 43.

The ramp load mechanism 17 is disposed at a position separated from the first rotation axis Ax1 in the radial direction of the first rotation axis Ax1. Further, the ramp load mechanism 17 is separated from the second rotation axis Ax2 in the radial direction Dr of the second rotation axis Ax2. The ramp load mechanism 17 includes a plurality of ramps 50.

Each of the plurality of ramps 50 is provided corresponding to the magnetic head 14 that reads and writes information from and to the recording surface 12a of the magnetic disk 12, and the actuator assembly 15 that moves the magnetic head 14. Therefore, the plurality of ramps 50 are arranged in the Z direction, each of the plurality of ramps separated by a gap in the Z direction. Corresponding magnetic disks 12 are arranged in the respective gaps between the plurality of ramps 50.

In the following description, for convenience, the recording surface 12a facing in the +Z direction, the magnetic head 14, the actuator assembly 15, and the ramp 50 corresponding to the recording surface 12a will be described. In the description of the recording surface 12a facing the −Z direction, the magnetic head 14, the actuator assembly 15, and the ramp 50 corresponding to the recording surface 12a can be obtained by interchanging the +Z direction and the −Z direction in the following description.

As shown in FIG. 2, the ramp 50 is located near the outer edge 12b of the magnetic disk 12. The ramp 50 covers a part of the recording surface 12a. The ramp 50 includes a second portion 51, a guide portion 52, and a wall 53.

The second portion 51 can hold the lift tab 45 at a position separated from the outer edge 12b in the radial direction of the first rotation axis Ax1. The second portion 51 may hold the lift tab 45 on an inner side of the outer edge 12b in the radial direction of the first rotation axis Ax1.

For example, the second portion 51 is provided with a recess 51a recessed in the −Z direction. When the lift tab 45 fits into the recess 51a, the ramp 50 holds the lift tab 45 and limits the rotation of the actuator assembly 15. The second portion 51 may hold the lift tab 45 by other means.

The lift tab 45 is held by the second portion 51 of the ramp 50 as described above when the magnetic head 14 does not read and write information from and to the magnetic disk 12 (during unloading). In other words, during unloading, the lift tab 45 is disposed at a position separated from the outer edge 12b of the magnetic disk 12 in the radial direction of the first rotation axis Ax1. The lift tab 45 during unloading may be located on the inner side of the outer edge 12b in the radial direction of the first rotation axis Ax1. In other words, the lift tab 45 during unloading may overlap the recording surface 12a in the axial direction (Z direction) of the first rotation axis Ax1.

On the other hand, when the magnetic head 14 reads and writes information from and to the magnetic disk 12 (during loading), the lift tab 45 is basically located on the recording surface 12a of the magnetic disk 12 together with the magnetic head 14. In other words, during loading, the recording surface 12a faces the lift tab 45 via an interval. During loading, at least a part of the lift tab 45 may be disposed at a position separated from the recording surface 12a in the radial direction of the first rotation axis Ax1.

The lift tab 45 moves between the area above the recording surface 12a and the position (home position) held by the second portion 51 in accordance with the rotation of the actuator assembly 15. When the lift tab 45 is held by the second portion 51, the magnetic head 14 is separated from the recording surface 12a of the magnetic disk 12 in the Z direction and the radial direction of the first rotation axis Ax1. When the lift tab 45 is held by the second portion 51, the magnetic head 14 may overlap the recording surface 12a in the Z direction.

The lift tab 45 moves (rotates) around the second rotation axis Ax2 according to the rotation of the actuator assembly 15. In the present embodiment, the moving direction of the lift tab 45 is approximately along the radial direction of the first rotation axis Ax1. Therefore, the lift tab 45 can move approximately in the radial direction of the first rotation axis Ax1 in accordance with the rotation of the actuator assembly 15.

Specifically, the lift tab 45 can move in the circumferential direction Da of the second rotation axis Ax2 (the radial direction of the first rotation axis Ax1) between the vicinity of the first rotation axis Ax1 and the second portion 51. That is, the lift tab 45 can move in the circumferential direction Da in the direction of approaching the first rotation axis Ax1 and away from the second portion 51, and in the direction of moving away from the first rotation axis Ax1 and approaching the second portion 51.

As shown in FIG. 3, the actuator assembly 15 rotates around the second rotation axis Ax2 between a load position P1 and an unload position Pu. The load position P1 and the unload position Pu are angles (positions) around the second rotation axis Ax2 on which the actuator assembly 15 extends.

During loading, the actuator assembly 15 is located at the load position P1. That is, when the actuator assembly 15 is located at the load position P1, the magnetic head 14 is located on the recording surface 12a of the magnetic disk 12. In the following description, the position of the magnetic head 14 around the second rotation axis Ax2 when the actuator assembly 15 is located at the load position P1 may also be referred to as the load position P1. Further, the load position P1 is not limited to one position and includes a plurality of positions where the magnetic head 14 is located on the recording surface 12a.

On the other hand, during unloading, the actuator assembly 15 is located at the unload position Pu. That is, when the actuator assembly 15 is located at the unload position Pu, the lift tab 45 is held by the second portion 51 so that the magnetic head 14 is separated from the recording surface 12a. In the following description, the position of the magnetic head 14 around the second rotation axis Ax2 when the actuator assembly 15 is located at the unload position Pu may also be referred to as the unload position Pu.

The magnetic head 14 at the unload position Pu is separated from the recording surface 12a in the Z direction. A gap may also be formed between the magnetic head 14 and the recording surface 12a at the load position P1. However, in the Z direction, the magnetic head 14 at the unload position Pu is separated from the recording surface 12a farther than the magnetic head 14 at the load position P1.

The guide portion 52 of the ramp 50 is located between the load position P1 and the unload position Pu in the circumferential direction Da of the second rotation axis Ax2. In other words, the guide portion 52 is located between the first rotation axis Ax1 and the second portion 51 in the radial direction of the first rotation axis Ax1.

Figure 4:
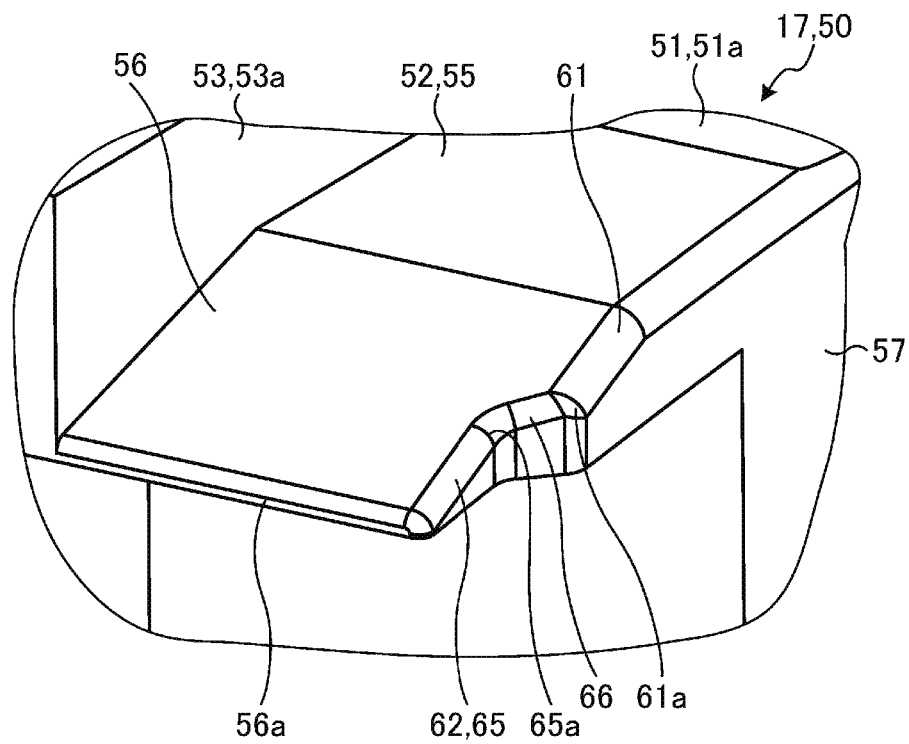
FIG. 4 is an illustrative perspective view showing a ramp of the first embodiment.

FIG. 4 is an illustrative perspective view showing the ramp 50 of the first embodiment. As shown in FIG. 4, the guide portion 52 is connected to the second portion 51. The guide portion 52 includes a flat surface 55, a slope 56, and an end surface 57.

The flat surface 55 is a flat surface substantially parallel to the recording surface 12a of the magnetic disk 12. That is, the flat surface 55 spreads along the X-Y plane and faces in the +Z direction. A recess 51a of the second portion 51 is recessed in the −Z direction from the flat surface 55.

As shown in FIG. 2, the flat surface 55 is disposed at a position separated from the recording surface 12a in the circumferential direction Da of the second rotation axis Ax2 (the radial direction of the first rotation axis Ax1). The position of the flat surface 55 is not limited to this example. As shown in FIG. 3, the flat surface 55 is separated from the recording surface 12a in the +Z direction in the Z direction.

The slope 56 is located between the first rotation axis Ax1 and the flat surface 55 in the circumferential direction Da of the second rotation axis Ax2 (the radial direction of the first rotation axis Ax1). The slope 56 may be included in the load position P1 at least partially. The slope 56 is connected to the end of the flat surface 55 in the circumferential direction Da.

The slope 56 extends diagonally with respect to the recording surface 12a so as to move away from the flat surface 55 and closer to the recording surface 12a in the Z direction as the distance to the first rotation axis Ax1 is reduced. The slope 56 is, for example, a flat surface extending substantially linearly. The slope 56 is not limited to this example, and may be, for example, a curved surface.

As shown in FIG. 2, the end surface 57 is provided at the inner end of the guide portion 52 in the radial direction Dr of the second rotation axis Ax2. The guide portion 52 may have a portion located on the inner side in the radial direction Dr than the end surface 57. As shown in FIG. 4, the flat surface 55 and the slope 56 are each connected to the end of the end surface 57 in the +Z direction.

The wall 53 is disposed on an outer side of the second portion 51 and the guide portion 52 in the radial direction Dr of the second rotation axis Ax2. In other words, in the radial direction Dr, the second portion 51 and the guide portion 52 are located between the wall 53 and the second rotation axis Ax2.

The wall 53 includes a side surface 53a. The side surface 53a faces inward in the radial direction Dr of the second rotation axis Ax2. The side surface 53a is, for example, a flat surface extending substantially linearly in a direction substantially orthogonal to the radial direction Dr. The side surface 53a is not limited to this example.

The side surface 53a of the wall 53 extends in the substantially +Z direction from the outer ends of the flat surface 55 and the slope 56 in the radial direction Dr of the second rotation axis Ax2. In another expression, the second portion 51 and the guide portion 52 project inward in the radial direction Dr from the side surface 53a.

Each of the plurality of ramps 50 further includes a first support 61 and a second support 62. In other words, the ramp 50 is provided with the first support 61 and the second support 62.

As shown in FIG. 2, the first support 61 is provided in a part of the guide 52. In other words, the first support 61 is located between the first rotation axis Ax1 and the second portion 51 in the circumferential direction Da of the second rotation axis Ax2 (the radial direction of the first rotation axis Ax1). In the present embodiment, the first support 61 is provided at an inner end of a part of the flat surface 55 and a part of the slope 56 in the radial direction Dr of the second rotation axis Ax2. The first support 61 may be provided on the flat surface 55 and a part of the slope 56.

The first support 61 provided at the end of the slope 56 extends diagonally with respect to the recording surface 12a, like the slope 56. That is, a part of the first support 61 extends so as to be separated from the recording surface 12a in the Z direction as the distance from the first rotation axis Ax1 increases. The first support 61 is not limited to this example.

As shown in FIG. 4, the first support 61 is provided at a corner between the flat surface 55 and the end surface 57, and at a corner between a part of the slope 56 and the end surface 57. The first support 61 is formed, for example, in a curved surface shape. The first support 61 is not limited to this example.

As shown in FIG. 2, the first support 61 extends around the second rotation axis Ax2 in a plan view seen in the axial direction of the second rotation axis Ax2. In other words, the first support 61 extends in a substantial arc shape in the circumferential direction Da of the second rotation axis Ax2. Therefore, in the radial direction Dr of the second rotation axis Ax2, the distance between the first support 61 and the second rotation axis Ax2 is substantially constant.

The inner end of the part of the flat surface 55 and the slope 56 in the radial direction Dr of the second rotation axis Ax2 also extends around the second rotation axis Ax2. Further, the distance between the first support 61 and the side surface 53a of the wall 53 in the radial direction Dr of the second rotation axis Ax2 is longer as it is closer to the first rotation axis Ax1.

The second support 62 is provided in another part of the guide portion 52. The second support 62 is located between the first rotation axis Ax1 and the first support 61 in the circumferential direction Da of the second rotation axis Ax2 (the radial direction of the first rotation axis Ax1). In the present embodiment, the second support 62 is provided at the inner end of the part of the slope 56 in the radial direction Dr of the second rotation axis Ax2.

The second support 62 extends diagonally with respect to the recording surface 12a, like the slope 56. That is, the second support 62 extends so as to be separated from the recording surface 12a as the distance from the first rotation axis Ax1 increases. The second support 62 is not limited to this example.

As shown in FIG. 4, the second support 62 is provided at a corner between a part of the slope 56 and the end surface 57. The second support 62 is formed, for example, in a curved surface shape. The second support 62 is not limited to this example.

As shown in FIG. 2, the second support 62 has a discontinuous shape from the first support 61. In other words, the second support 62 is different from the first support 61. The second support 62 of the present embodiment includes a first extension 65 and a second extension 66.

The first extension 65 extends around the second rotation axis Ax2 in a plan view of the second rotation axis Ax2 in the axial direction. In other words, the first extension 65 extends in a substantial arc shape in the circumferential direction Da of the second rotation axis Ax2. Therefore, in the radial direction Dr of the second rotation axis Ax2, the distance between the first extension 65 and the second rotation axis Ax2 is substantially constant.

The first extension 65 and the first support 61 extend in a concentric arc shape. In the radial direction Dr of the second rotation axis Ax2, the distance between the first extension 65 and the second rotation axis Ax2 is longer than the distance between the first support 61 and the second rotation axis Ax2. In other words, the first extension 65 is separated from the second rotation axis Ax2 farther than the first support 61.

As shown in FIG. 4, the second extension 66 is provided between the first extension 65 and the first support 61. The second extension 66 is connected to an end 65a of the first extension 65 in the circumferential direction Da of the second rotation axis Ax2 and an end 61a of the first support 61 in the circumferential direction Da. The second extension 66 extends substantially linearly between the end 65a of the first extension 65 and the end 61a of the first support 61. The second extension 66 is not limited to this example.

The second extension 66 extends diagonally with respect to the radial direction Dr of the second rotation axis Ax2 so as to be separated from the second rotation axis Ax2 as it is closer to the first extension 65. The second extension 66 is not limited to this example and may extend in the radial direction Dr, for example.

As shown in FIG. 2, the length of the second extension 66 in the circumferential direction Da of the second rotation axis Ax2 is shorter than the length of the second extension 66 in the radial direction Dr of the second rotation axis Ax2. Further, the length of the second extension 66 in the circumferential direction Da is shorter than the length of the first extension 65 in the circumferential direction Da.

The second support 62 overlaps the recording surface 12a of the magnetic disk 12 in the Z direction. Therefore, the end 61a of the first support 61 also overlaps the recording surface 12a in the Z direction. The position of the second support 62 is not limited to this example.

As shown in FIG. 3, in the Z direction, the first support 61 and the second support 62 are separated from the recording surface 12a in the +Z direction. In the Z direction, at least a part of the first support 61 is separated from the recording surface 12a in the +Z direction farther than the lift tab 45 at the load position P1. Further, in the Z direction, the second support 62 is located between the first support 61 and the recording surface 12a.

Figure 5:
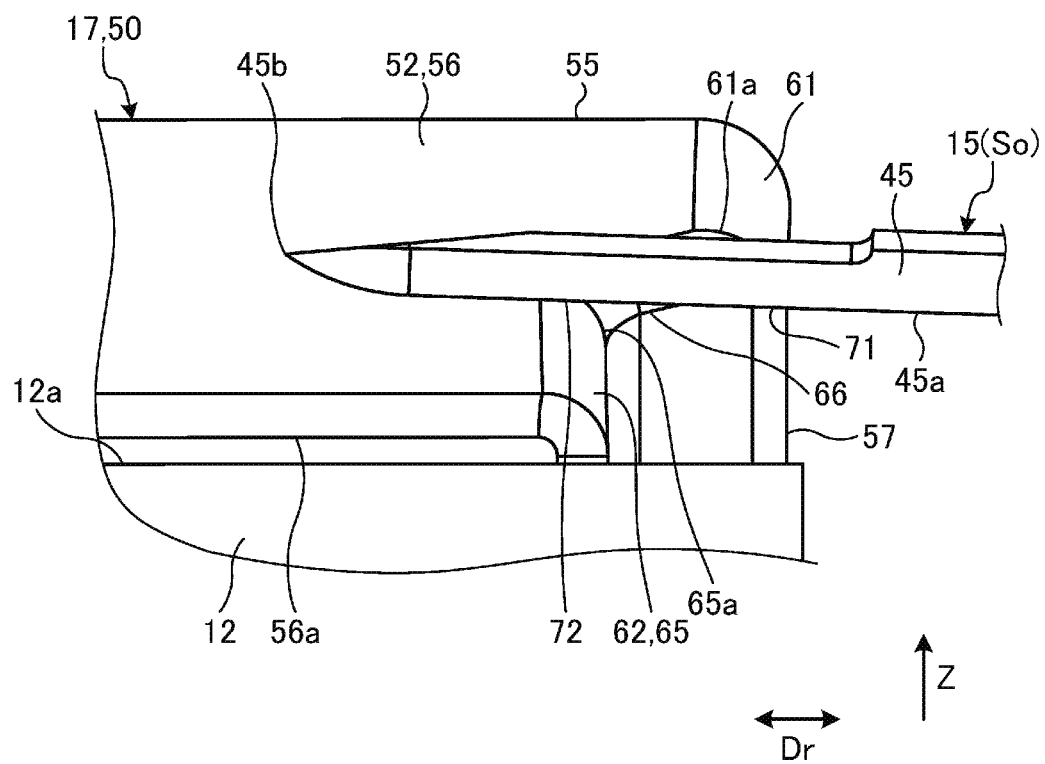
FIG. 5 is an illustrative side view showing the lift tab and the ramp of the first embodiment.

FIG. 5 is an illustrative side view showing the lift tab 45 and the ramp 50 of the first embodiment. As shown in FIG. 5, the lift tab 45 extends diagonally with respect to the recording surface 12a so as to be separated from the recording surface 12a in the Z direction as the distance from the second rotation axis Ax2 increases. In other words, the lift tab 45 extends so as to be separated from the recording surface 12a as it is closer to a tip 45b of the lift tab 45.

The tip 45b is the outer end of the lift tab 45 in the radial direction Dr of the second rotation axis Ax2. Further, the tip 45b is also the outer end of the actuator assembly 15 in the radial direction Dr. In the radial direction Dr, the tip 45b is separated from the second rotation axis Ax2 farther than the first support 61 and the second support 62. Further, as shown in FIG. 2, in the radial direction Dr, the tip 45b is closer to the second rotation axis Ax2 than the side surface 53a of the wall 53.

As shown in FIG. 5, the lift tab 45 is tilted by about 2° with respect to the recording surface 12a of the corresponding magnetic disk 12. The angle between the lift tab 45 and the recording surface 12a is not limited to this example. The lift tab 45 may extend in a curved shape so that the angle between the lift tab 45 and the recording surface 12a gradually changes.

As shown in FIG. 3, when the actuator assembly 15 moves from the load position P1 to the unload position Pu, the lift tab 45 comes into contact with the second support 62. When the actuator assembly 15 further moves toward the unload position Pu, the lift tab 45 moves while being supported by the second support 62 and is gradually separated from the recording surface 12a in the Z direction.

When the actuator assembly 15 further moves toward the unload position Pu, the lift tab 45 moves from the second support 62 to the first support 61. When the actuator assembly 15 further moves toward the unload position Pu, the lift tab 45 moves while being supported by the first support 61, and finally reaches the recess 51a of the second portion 51.

In the following description, the magnetic head 14 and the lift tab 45 while the actuator assembly 15 moves from the load position P1 to the unload position Pu will be described in detail. As shown in FIG. 2, when the actuator assembly 15 is located at the load position P1, the magnetic head 14 is located on the recording surface 12a.

The recording surface 12a includes a data area 12c and an invalid area 12d. The data area 12c is an area of the recording surface 12a in which information can be read and written by the magnetic head 14. When the actuator assembly 15 is located at the load position P1, the magnetic head 14 is located on the data area 12c. The invalid area 12d is provided between the data area 12c and the outer edge 12b of the recording surface 12a. The invalid area 12d is, for example, an area in which information cannot be read and written by the magnetic head 14.

As shown in FIG. 3, when the actuator assembly 15 is located at the load position P1, the magnetic head 14 floats on the recording surface 12a due to the airflow generated between the rotating magnetic disk 12 and the magnetic head 14. That is, the magnetic head 14 at the load position P1 is slightly separated from the recording surface 12a in the Z direction. The airflow generates a force that separates the magnetic head 14 from the recording surface 12a (positive pressure) and a force that brings the magnetic head 14 closer to the recording surface 12a (negative pressure). The airflow keeps the magnetic head 14 away from the recording surface 12a and at an attachment position Pa where the positive pressure and the negative pressure are balanced. The magnetic head 14 at the load position P1 is not limited to this example.

At the load position P1, the lift tab 45 is separated from the ramp 50. In the Z direction, the lift tab 45 is separated from the magnetic head 14 at a predetermined interval. The distance between the lift tab 45 and the magnetic head 14 can be changed by, for example, the vibration of the load beam 42.

As moving from the load position P1 to the unload position Pu, the actuator assembly 15 reaches an outer sliding section So between the load position P1 and the unload position Pu. The outer sliding section So is an example of the second sliding position. The outer sliding section So is a range of a predetermined angle of the actuator assembly 15 around the second rotation axis Ax2.

When the actuator assembly 15 reaches the outer sliding section So, the lift tab 45 comes into contact with the second support 62. In this embodiment, the lift tab 45 abuts on the first extension 65. The lift tab 45 may abut on the second extension 66.

When the actuator assembly 15 further rotates toward the unload position Pu, the lift tab 45 moves while being supported by the second support 62. In other words, the second support 62 supports the lift tab 45 while the actuator assembly 15 rotates in the outer sliding section So.

While the actuator assembly 15 rotates in the outer sliding section So, the lift tab 45 is gradually separated from the recording surface 12a of the magnetic disk 12. The load beam 42 and the gimbal portion 46 pull the magnetic head 14 in the +Z direction according to the displacement of the lift tab 45. However, while the actuator assembly 15 is located in the outer sliding section So, the magnetic head 14 is maintained at the attachment position Pa in the Z direction by the airflow between the magnetic head 14 and the recording surface 12a.

When the actuator assembly 15 is located in the outer sliding section So, the magnetic head 14 is located on the invalid area 12d of the recording surface 12a. When the actuator assembly 15 is located at least a part of the outer sliding section So, the magnetic head 14 may be located on the data area 12c.

The actuator assembly 15 reaches an inner sliding section Si by moving toward the unload position Pu in the outer sliding section So. The inner sliding section Si is an example of the first sliding position. The inner sliding section Si is a range of a predetermined angle of the actuator assembly 15 around the second rotation axis Ax2.

The inner sliding section Si is located between the load position P1 and the unload position Pu in the circumferential direction Da of the second rotation axis Ax2. Further, the outer sliding section So is located between the load position P1 and the inner sliding section Si in the circumferential direction Da.

When the actuator assembly 15 reaches the inner sliding section Si, the lift tab 45 moves from the second support 62 to the first support 61. When the actuator assembly 15 further rotates toward the unload position Pu, the lift tab 45 moves while being supported by the first support 61. In other words, the first support 61 supports the lift tab 45 while the actuator assembly 15 rotates in the inner sliding section Si.

When the actuator assembly 15 reaches the inner sliding section Si, the force with which the load beam 42 and the gimbal portion 46 pull the magnetic head 14 exceeds the force that the airflow between the magnetic head 14 and the recording surface 12a causes the magnetic head 14 to maintain at the attachment position Pa. Therefore, in the inner sliding section Si, the magnetic head 14 can be separated from the recording surface 12a of the magnetic disk 12 in the Z direction.

The lift tab 45 is gradually separated from the recording surface 12a while moving toward the unload position Pu while being supported by the first support 61 provided at the end of the slope 56. The load beam 42 and the gimbal portion 46 separate (peel off) the magnetic head 14 from the recording surface 12a according to the displacement of the lift tab 45. In other words, in the Z direction, the magnetic head 14 is separated from the recording surface 12a farther than the magnetic head 14 at the load position P1. As the actuator assembly 15 approaches the unload position Pu, the distance between the magnetic head 14 and the recording surface 12a becomes longer.

While the lift tab 45 moves toward the unload position Pu while being supported by the first support 61 provided at the end of the flat surface 55, the magnetic head 14 is maintained at a position separated from the recording surface 12a in the Z direction. When the actuator assembly 15 reaches the unload position Pu, the lift tab 45 fits into the recess 51a of the second portion 51, and the magnetic head 14 slightly approaches the recording surface 12a. However, at the unload position Pu, the magnetic head 14 is separated from the recording surface 12a in the Z direction. Further, at the unload position Pu, the magnetic head 14 is separated from the magnetic disk 12 in the radial direction of the first rotation axis Ax1.

Figure 6:
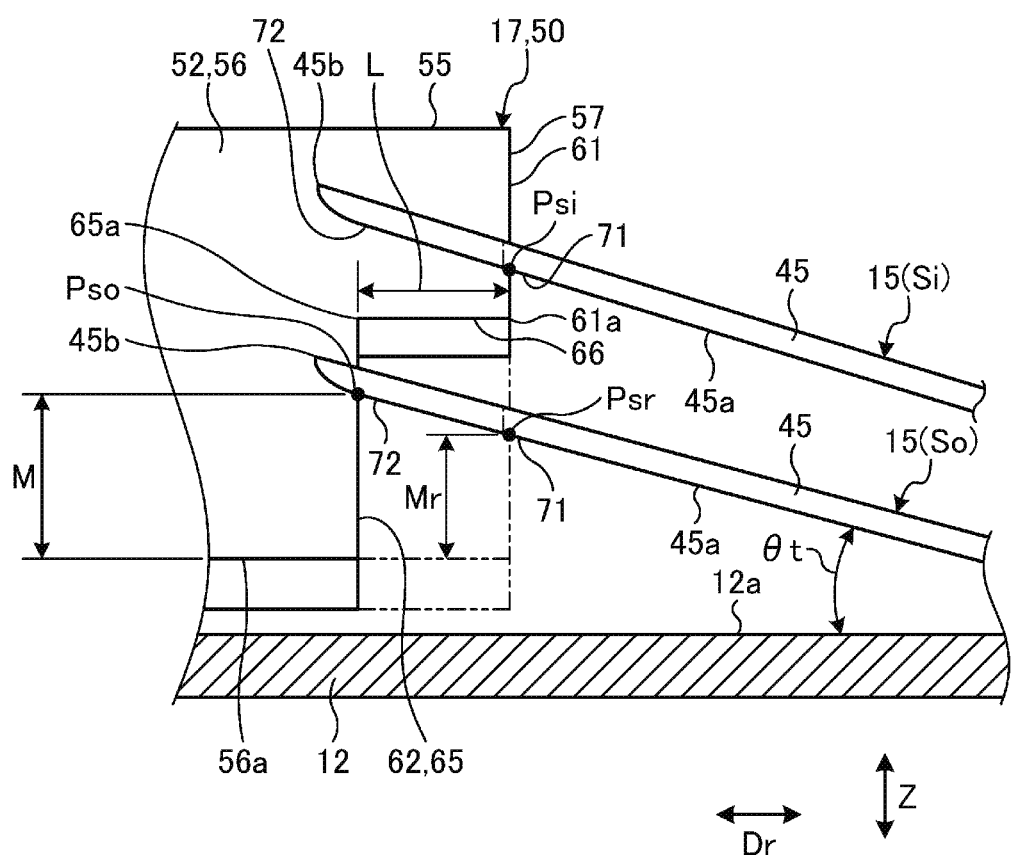
FIG. 6 is an illustrative side view schematically showing the lift tab and the ramp of the first embodiment.

FIG. 6 is an illustrative side view schematically showing the lift tab 45 and the ramp 50 of the first embodiment. As shown in FIG. 6, the lift tab 45 includes a first subportion 71 and a second subportion 72. In FIG. 6, the first subportion 71 and the second subportion 72 are schematically separated by a two-dot chain line.

The first subportion 71 and the second subportion 72 are arranged in the radial direction Dr of the second rotation axis Ax2. The second subportion 72 is closer to the tip 45b of the lift tab 45 than the first subportion 71. That is, in the radial direction Dr, the second subportion 72 is separated from the second rotation axis Ax2 farther than the first subportion 71.

Further, in the Z direction, the second subportion 72 is separated from the recording surface 12a farther than the first subportion 71.

When the actuator assembly 15 is located in the inner sliding section Si, the first support 61 supports the first subportion 71 of the lift tab 45. The first support 61 supports the first subportion 71 of the lift tab 45 so that the magnetic head 14 is separated from the recording surface 12a farther than the magnetic head 14 at the load position P1 in the Z direction.

On the other hand, when the actuator assembly 15 is located in the outer sliding section So, the second support 62 supports the second portion 72 of the lift tab 45. For example, when the actuator assembly 15 is located in a part of the outer sliding section So, the first extension 65 supports the second portion 72 of the lift tab 45. Further, when the actuator assembly 15 is located in another part of the outer sliding section So, the second extension 66 supports the second portion 72 of the lift tab 45.

As described above, the second support 62 is separated from the second rotation axis Ax2 farther than the first support 61. Therefore, in the radial direction Dr of the second rotation axis Ax2, the position Pso of the lift tab 45 supported by the second support 62 is separated from the second rotation axis Ax2 father than the position Psi of the lift tab 45 supported by the first support 61. The position Pso is located at the second portion 72. Further, the position Psi is located in the first subportion 71.

While the lift tab 45 moves toward the unload position Pu while being supported by the second extension 66, the position of the lift tab 45 supported by the second extension 66 moves (changes) from the position Pso to the position Psi in the radial direction Dr of the second rotation axis Ax2. In other words, while the lift tab 45 moves toward the unload position Pu while being supported by the second extension 66, the position of the lift tab 45 supported by the second extension 66 approaches the second rotation axis Ax2.

As described above, the lift tab 45 extends so as to be separated from the recording surface 12a as the distance from the second rotation axis Ax2 increases. Therefore, when the position of the lift tab 45 supported by the second extension 66 approaches the second rotation axis Ax2, the lift tab 45 is rapidly separated from the recording surface 12a.

For example, as shown by the alternate long and short dash line in FIG. 6, a comparative example in which the ramp 50 does not include the second support 62 will be examined. In the comparative example, the lift tab 45 that moves from the load position P1 to the unload position Pu abuts on the extended first support 61 indicated by the alternate long and short dash line. The first support 61 is closer to the second rotation axis Ax2 than the second support 62. Therefore, in the comparative example, the position Psr of the lift tab 45 that abuts on the first support 61 is closer to the recording surface 12a in the Z direction than the position Pso of the lift tab 45 that abuts on the second support 62 in the present embodiment.

For example, the lift tab 45 may be displaced from a predetermined position in the Z direction due to dimensional variations of each component of the HDD 10 or vibration of the load beam 42. In the present embodiment, a margin M shown in FIG. 6 is set. The margin M is a range in the Z direction between the position Pso and the end 56a of the slope 56 in the −Z direction when the lift tab 45 is in a predetermined position in the Z direction.

For example, even if the lift tab 45 is displaced in the Z direction due to dimensional variation or vibration, the lift tab 45 can come into contact with the second support 62 as long as it is within the margin M in the Z direction. The longer the margin M, the more reliably the lift tab 45 can be supported by the second support 62.

On the other hand, in the modification, the position Psr is closer to the recording surface 12a in the Z direction than the position Pso. Therefore, the margin Mr of the modification is shorter than the margin M of the present embodiment. The margin Mr of the modification is the range in the Z direction between the position Psr and the end 56a of the slope 56 when the lift tab 45 is in a predetermined position in the Z direction.

Since the margin Mr is short in the modification, the lift tab 45 may be closer to the recording surface 12a than the end 56a of the slope 56 due to dimensional variation or vibration. In this case, the lift tab 45 is not supported by the ramp 50 and may interfere with the ramp 50 to limit the rotation of the actuator assembly 15.

On the other hand, the ramp 50 of the present embodiment can be set to have a long margin M. Therefore, even if the dimensional variation and vibration occur, the lift tab 45 can come into contact with the second support 62 and is more reliably supported by the ramp 50.

For example, the margin M of the present embodiment is ΔM longer than the margin Mr of the comparative example as shown in the following mathematical formula (Equation 1). In the mathematical formula (Equation 1), L is the distance between the first support 61 and the first extension 65 in the radial direction Dr of the second rotation axis Ax2. θt is the inclination of the lift tab 45 with respect to the recording surface 12a.

$$\Delta M = L \times \tan \theta t \qquad \text{(Equation 1)}$$

Further, as shown in FIG. 3, the lift tab 45 of the present embodiment comes into contact with the second support 62 at the position Pso. The position Pso is separated from the first rotation axis Ax1 farther than the position Psr where the lift tab 45 of the comparative example shown by the alternate long and short dash line abuts on the first support 61. Therefore, in the HDD 10 of the present embodiment, the data area 12c can be set wider than in the comparative example, and the storage capacity can be increased.

For example, the distance between the position Pso of the present embodiment and the second rotation axis Ax2 is ΔR longer than the distance between the position Psr of the comparative example and the second rotation axis Ax2 as shown in the following mathematical formula (Equation 2). In the mathematical formula (Equation 2), θs is the inclination of the slope 56 with respect to the recording surface 12a.

$$\Delta R = (L \times \tan \theta t)/\tan \theta s \qquad \text{(Equation 2)}$$

The first support 61 in the above comparative example can be set far from the second rotation axis Ax2 like the second support 62 of the present embodiment. However, in this case, the timing at which the magnetic head 14 is separated from the recording surface 12a is delayed, and the magnetic head 14 may continue to adhere to the recording surface 12a up to the outer edge 12b of the magnetic disk 12. In this embodiment, the lift tab 45 is more rapidly separated from the recording surface 12a as it moves from the second support 62 to the first support 61. Therefore, the magnetic head 14 can be separated from the recording surface 12a before reaching the outer edge 12b of the magnetic disk 12.

Further, the angle between the slope 56 and the recording surface 12a in the above comparative example can be set large in order to rapidly separate the magnetic head 14 from the recording surface 12a. However, in this case, as the angle between the slope 56 and the recording surface 12a becomes large, the load of the lift tab 45 that moves while being supported by the first support 61 increases, and thus, there is a risk of wearing the ramp 50 and affecting the control of the actuator assembly 15. In this embodiment, since it is not necessary to set a large angle between the slope 56 and the recording surface 12a, it is possible to prevent the occurrence of a large load on the lift tab 45.

In the HDD 10 according to the first embodiment described above, the actuator assembly 15 includes the lift tab 45 separated from the second rotation axis Ax2, and the gimbal portion 46 that is located at the position between the lift tab 45 and the second rotation axis Ax2, and holds the magnetic head 14. The actuator assembly 15 is configured to rotate about the second rotation axis Ax2 between the load position P1 and the unload position Pu. When the actuator assembly 15 is located at the load position P1, the magnetic head 14 is located on the recording surface 12a. When the actuator assembly 15 is located at the unload position Pu, the lift tab 45 is held by the ramp 50 such that the magnetic head 14 in the axial direction (Z direction) of the first rotation axis Ax1 is separated from the recording surface 12a farther than the magnetic head 14 at the load position P1. The ramp 50 is provided with the first support 61 and the second support 62. The first support 61 extends around the second rotation axis Ax2 and is configured to support the first subportion 71 of the lift tab 45 such that when the actuator assembly 15 is located in the inner sliding section Si between the load position P1 and the unload position Pu, the magnetic head 14 in the Z direction is separated from the recording surface 12a farther than the magnetic head 14 at the load position P1. The second support 62 is configured to support the second portion 72 of the lift tab 45 that is separated from the second rotation axis Ax2 farther than the first subportion 71 and separated from the recording surface 12a farther than the first subportion 71 in the Z direction when the actuator assembly 15 is located in the outer sliding section So between the load position P1 and the inner sliding section Si. As a result, when the actuator assembly 15 rotates toward the unload position Pu, the lift tab 45 abuts on the second support 62 of the ramp 50 at the position Pso where it is separated from the recording surface 12a in the Z direction, as compared with the case where the ramp 50 does not include the second support 62. Therefore, even if the lift tab 45 is displaced in the Z direction from a predetermined position due to, for example, dimensional variation or vibration, the second support 62 can more reliably support the lift tab 45. Further, the first support 61 extends around the second rotation axis Ax2 and supports the first subportion 71 which is closer to the second rotation axis Ax2 and the recording surface 12a than the second portion 72. As a result, when the actuator assembly 15 rotates toward the unload position Pu, the first support 61 can separate the magnetic head 14 from the recording surface 12a earlier, as compared with the case when the ramp 50 does not include the first support 61. Therefore, for example, the HDD 10 can prevent the magnetic head 14 from continuing to adhere to the recording surface 12a up to the outer edge 12b of the magnetic disk 12. In addition, the lift tab 45 abuts on the second support 62 of the ramp 50 at the position Pso where it is separated from the second rotation axis Ax2 when the actuator assembly 15 rotates towards the unload position Pu, as compared with the case when the ramp 50 does not include the second support 62. Therefore, the HDD 10 can set the load position P1 widely, expand the data area 12c in the magnetic disk 12, and increase the storage capacity of the magnetic disk 12.

The second support 62 includes the first extension 65 extending around the second rotation axis Ax2. As a result, when the actuator assembly 15 rotates toward the unload position Pu, the lift tab 45 abuts on the second support 62 of the ramp 50 at the position Pso separated farther from the recording surface 12a regardless of which portion of the first extension 65 abuts. Therefore, for example, even if the dimensional variation or vibration occurs, the first extension 65 can more reliably support the lift tab 45 at the position Pso separated farther from the recording surface 12a.

The second support 62 includes the second extension 66 provided between the first extension 65 and the first support 61. The length of the second extension 66 in the circumferential direction Da of the second rotation axis Ax2 is shorter than the length of the second extension 66 in the radial direction Dr of the second rotation axis Ax2. As a result, in the circumferential direction Da, the first extension 65 of the second support 62 can be set to be relatively large. Therefore, when the actuator assembly 15 rotates toward the unload position Pu, the lift tab 45 is more likely to come into contact with the first extension 65 than the second extension 66.

The lift tab 45 extends so as to be separated from the recording surface 12a in the Z direction as the distance from the second rotation axis Ax2 increases. As a result, when the actuator assembly 15 rotates toward the unload position Pu, the lift tab 45 can be supported by the first support 61 and the second support 62 of the ramp 50, and can prevent restricting the rotation of the ramp 50 or floating from the ramp 50.

The second support 62 extends so as to be separated from the recording surface 12a as the distance from the first rotation axis Ax1 increases. As a result, when the actuator assembly 15 rotates toward the unload position Pu, the lift tab 45 can come into contact with the second support 62 of the ramp 50 and it is possible to prevent restricting the rotation of the ramp 50 or floating from the ramp 50. Further, the second support 62 can gradually separate the lift tab 45 from the recording surface 12a while the lift tab 45 rotates from the second support 62 toward the first support 61.

At least a part of the first support 61 extends so as to be separated from the recording surface 12a in the Z direction as the distance from the first rotation axis Ax1 increases. As a result, even after the magnetic head 14 is separated from the recording surface 12a, the first support 61 further separates the magnetic head 14 from the recording surface 12a in response to the rotation of the actuator assembly 15 toward the unload position Pu. Therefore, the magnetic head 14 can be reliably separated from the recording surface 12a at the unload position Pu.

Second Embodiment

Hereinafter, a second embodiment will be described with reference to FIG. 7. In the following description of the plurality of embodiments, the components having the same functions as the components already described are designated by the same reference numerals as those described above, and the description may be omitted. Further, the plurality of components with the same reference numerals do not necessarily have all the functions and properties in common and may have different functions and properties according to each embodiment.

Figure 7:
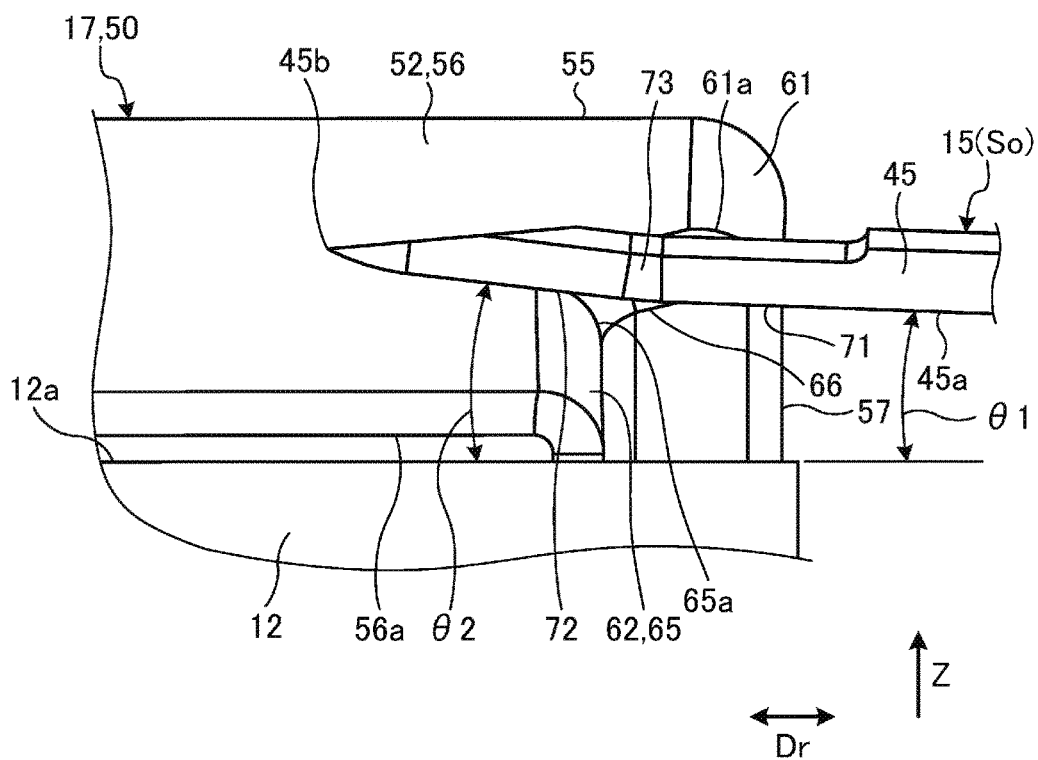
FIG. 7 is an illustrative side view showing a lift tab and a ramp according to a second embodiment.

FIG. 7 is an illustrative side view showing the lift tab 45 and the ramp 50 according to the second embodiment. As shown in FIG. 7, in the second embodiment, the lift tab 45 further includes a bent portion 73 bent between the first subportion 71 and the second portion 72. That is, in the bent portion 73, the first subportion 71 and the second subportion 72 are connected. In the present embodiment, the first angle θ1 between the first subportion 71 and the recording surface 12a is smaller than the second angle θ2 between the second subportion 72 and the recording surface 12a.

When the actuator assembly 15 moves from the load position P1 to the unload position Pu, the second subportion 72 collides with the second subportion 72. That is, when the actuator assembly 15 moves from the load position P1 to the unload position Pu, the second subportion 72 of the lift tab 45 abuts on the ramp 50 before other portions such as the first subportion 71. Other portions such as the first subportion 71 and the bent portion 73 may first come into contact with the ramp 50.

The second embodiment is not limited to the example shown in FIG. 7. For example, the lift tab 45 may extend in a curved shape so that the angle between the lift tab 45 and the recording surface 12a gradually changes. Also, in this case, the first angle θ1 between the first subportion 71 and the recording surface 12a is smaller than the second angle θ2 between the second portion 72 and the recording surface 12a.

In the HDD 10 of the second embodiment described above, the first angle θ1 between the first subportion 71 and the recording surface 12a is smaller than the second angle θ2 between the second portion 72 and the recording surface 12a. In other words, the second angle θ2 is larger than the first angle θ1. As a result, the lift tab 45 can come into contact with the second support 62 of the ramp 50 at a position separated farther away from the recording surface 12a when the actuator assembly 15 rotates toward the unload position Pu. Further, the lift tab 45 can come into contact with the second support 62 of the ramp 50 at a position separated farther away from the second rotation axis Ax2 when the actuator assembly 15 rotates toward the unload position Pu.

Third Embodiment

Figure 8:
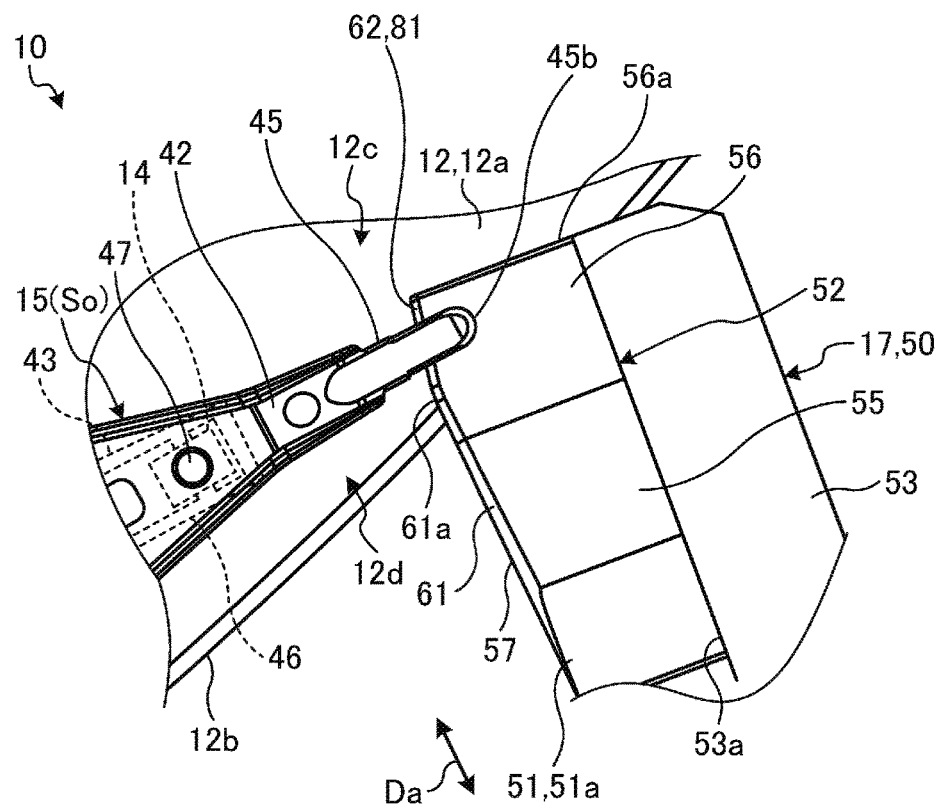
FIG. 8 is an illustrative plan view showing a part of an HDD according to a third embodiment.

Hereinafter, a third embodiment will be described with reference to FIG. 8. FIG. 8 is an illustrative plan view showing a part of the HDD 10 according to the third embodiment. As shown in FIG. 8, the second support 62 of the third embodiment includes an extension 81 instead of the first extension 65 and the second extension 66.

The extension 81 is connected to the end 61a of the first support 61 in the circumferential direction Da of the second rotation axis Ax2. The extension 81 extends substantially linearly from the end 61a of the first support 61. The extension 81 is not limited to this example. The distance between the extension 81 and the second rotation axis Ax2 in the radial direction Dr of the second rotation axis Ax2 is shorter as it is closer to the first support 61.

When the actuator assembly 15 is located in the outer sliding section So, the extension 81 supports the second portion 72 of the lift tab 45. While the lift tab 45 is supported by the extension 81 and moves toward the unload position Pu, the position where the lift tab 45 is supported by the ramp 50 approaches the second rotation axis Ax2 in the radial direction Dr of the second rotation axis Ax2.

The lift tab 45 extends so as to be separated from the recording surface 12a as the distance from the second rotation axis Ax2 increases. Therefore, when the position where the lift tab 45 is supported by the ramp 50 approaches the second rotation axis Ax2, the lift tab 45 is separated from the recording surface 12a.

In the HDD 10 of the third embodiment described above, the extension 81 of the second support 62 extends linearly. As a result, the displacement of the lift tab 45 in the Z direction becomes substantially constant while the actuator assembly 15 rotates in the outer sliding section So. As a result, the lift tab 45 can move smoothly on the second support 62.

According to at least one embodiment described above, the disk device includes a recording medium, a magnetic head, a ramp, an actuator, a first support, and a second support. The recording medium has a recording surface and is rotatable around a first rotation axis that intersects the recording surface. The magnetic head is configured to read and write information from and to the recording medium. The ramp is separated from the first rotation axis. The actuator includes a first portion extending so as to be separated from the second rotation axis and separated from the recording surface in the axial direction of the first rotation axis as the distance from the second rotation axis increases, and a second portion that is located between the first portion and the second rotation axis and holds the magnetic head, and is rotatable around the second rotation axis. The first support is provided on the ramp, extends around the second rotation axis, and can support the first portion so that the magnetic head is separated from the recording surface in the axial direction. The second support is provided on the ramp, is located between the first rotation axis and the first support, is separated from the second rotation axis farther than the first support, and can support the first portion. With the above disk device, when the first portion rotates in the direction from the first rotation axis toward the first support, the first portion abuts on the second support of the ramp at a position separated farther away from the recording surface, as compared with the case when the ramp does not include the second support. Therefore, for example, even if the dimensional variation or vibration occurs, the second support can more reliably support the first portion. Further, the first support extends around the second rotation axis and is closer to the second rotation axis than the second support. As a result, when the actuator rotates in the direction from the first rotation axis toward the first support, the first support can separate the magnetic head from the recording surface earlier, as compared with the case when the ramp does not include the first support. Therefore, for example, the disk device can prevent the magnetic head from continuing to adhere to the recording surface up to the outer edge of the recording medium. In addition, when the first portion rotates in the direction from the first rotation axis toward the first support, the first portion abuts on the second support of the ramp at a position separated farther away from the second rotation axis, as compared with the case when the ramp does not include the second support. Therefore, the disk device can set the load position widely, expand the data area in the recording medium, and increase the storage capacity of the recording medium.

In the above description, the prevention is defined as, for example, preventing the occurrence of an event, action, or effect, or reducing the degree of event, action, or effect. Further, in the above description, the restriction is defined as, for example, preventing movement or rotation, or allowing movement or rotation within a predetermined range and preventing movement or rotation beyond the predetermined range.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A disk device comprising:
   a recording medium having a recording surface, the recording medium being rotatable around a first rotation axis intersecting the recording surface;
   a magnetic head configured to read and write information from and to the recording medium;
   a ramp separated from the first rotation axis in a first radial direction;
   an actuator including a first portion separated from a second rotation axis in a second radial direction, and a second portion located between the first portion and the second rotation axis, the second portion configured to:
   hold the magnetic head, and
   rotate around the second rotation axis between a load position and an unload position;
   wherein in the load position, the magnetic head is located on the recording surface, and
   in the unload position, the first portion is held by the ramp and the magnetic head is separated in the axial direction of the first rotation axis from the recording surface at first distance larger than a distance between the magnetic head and the recording surface when the magnetic head is at the load position;
   a first support provided on the ramp, the first support extending around the second rotation axis and configured to support a first subportion of the first portion with the magnetic head separated in the axial direction from the recording surface at a second distance when the actuator is located in a first position between the load position and the unload position; and
   a second support provided on the ramp, the second support being configured to support a second subportion of the first portion, the second subportion being separated from the second rotation axis farther than the first subportion and being separated in the axial direction from the recording surface at a third distance when the actuator is located in a second position between the load position and the first position,
   wherein the first distance is greater than the second distance, and wherein the second distance is greater than the third distance.

2. The disk device according to claim 1, wherein the second support includes a first extension extending around the second rotation axis.

3. The disk device according to claim 2, wherein the second support includes a second extension provided between the first extension and the first support, and a length of the second extension in a circumferential direction of the second rotation axis is shorter than a length of the second extension in the second radial direction.

4. The disk device of claim 1, wherein the first portion extends so as to be separated from the recording surface in the axial direction as the distance from the second rotation axis increases.

5. The disk device according to claim 4, wherein a first angle between the first subportion and the recording surface is smaller than a second angle between the second subportion and the recording surface.

6. The disk device according to claim 5, wherein when the actuator moves from the load position to the unload position, the second subportion collides with the second support of the ramp.

7. The disk device of claim 1, wherein the second support extends so as to be separated from the recording surface as the distance from the first rotation axis increases.

8. The disk device according to claim 7, wherein at least a part of the first support extends so as to be separated from the recording surface in the axial direction as the distance from the first rotation axis increases.

9. The disk device according of claim 1, wherein one end of the first support in the circumferential direction of the second rotation axis overlaps the recording surface in the axial direction.

\* \* \* \* \*